July 7, 1959 G. S. HARTLEY ET AL 2,893,610
MECHANICAL DISTRIBUTORS FOR APPLYING ARTIFICIAL
MANURES AND OTHER GRANULAR MATERIALS TO LAND
Filed Jan. 23, 1957 3 Sheets-Sheet 1
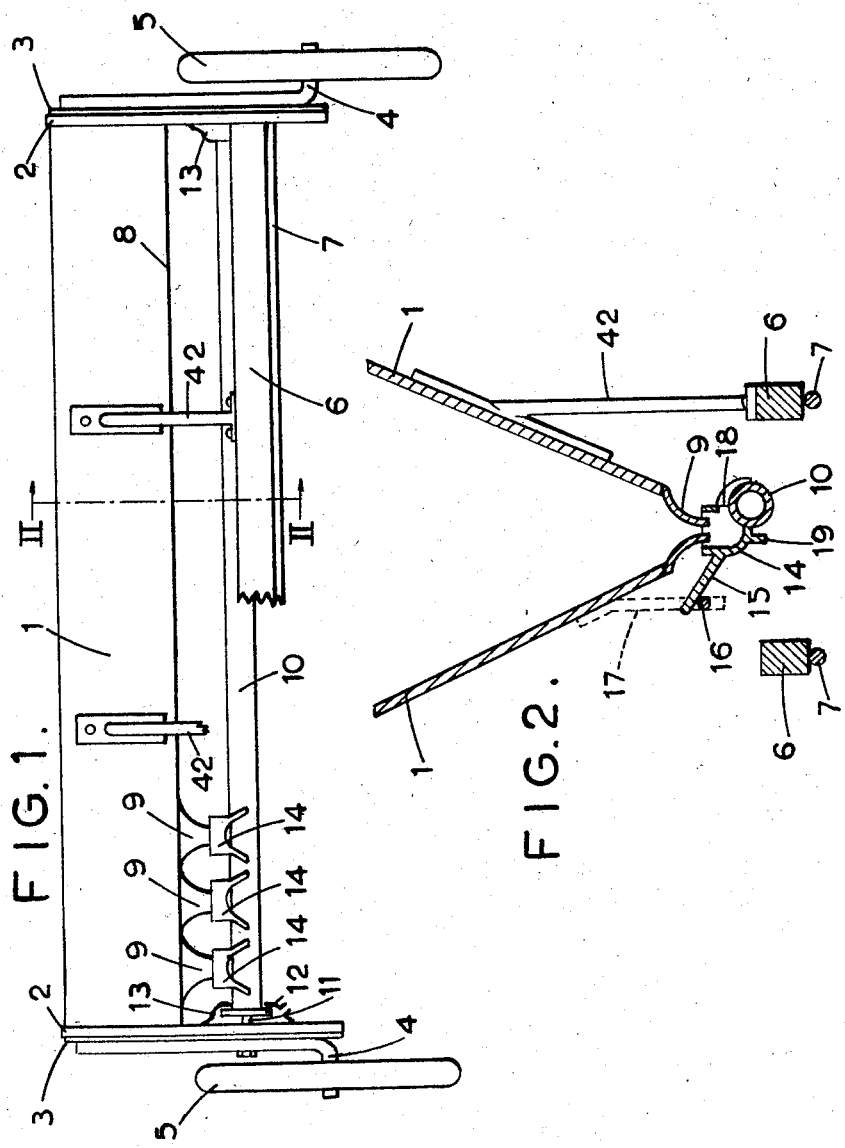
Inventors
Gilbert S. Hartley
by Marian G. Hartley
Albert Jacobs
Attorney

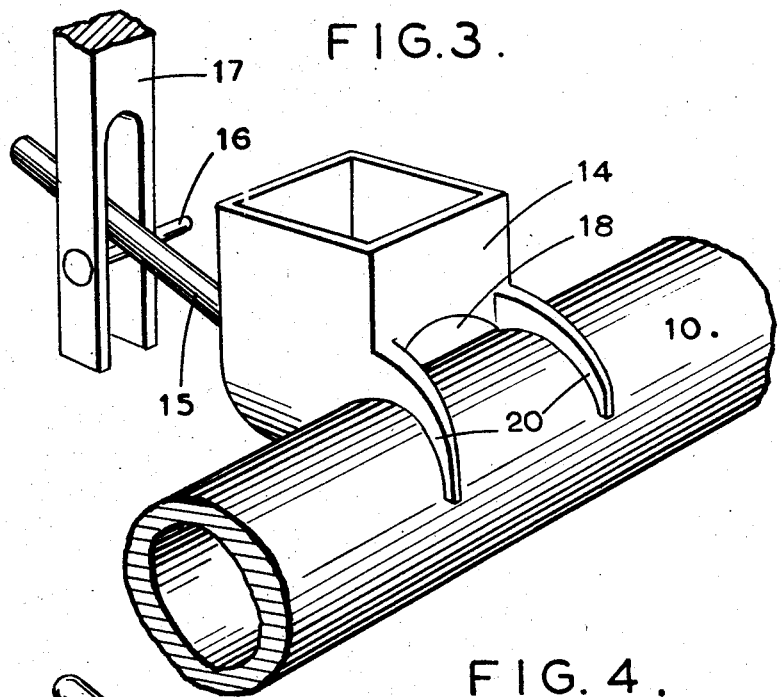
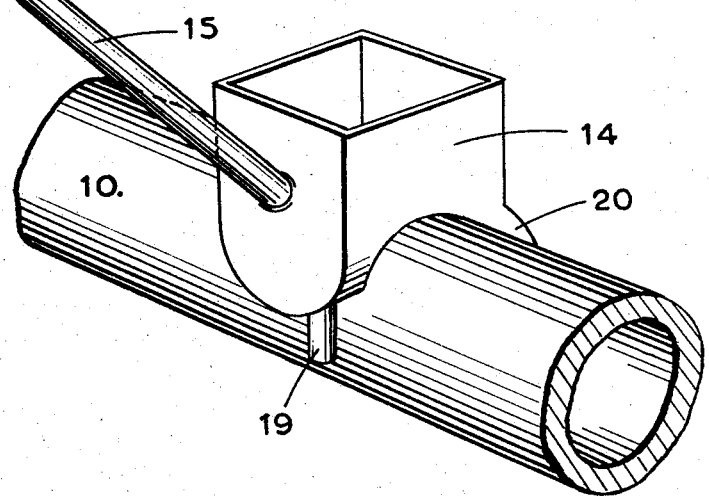

July 7, 1959 G. S. HARTLEY ET AL 2,893,610
MECHANICAL DISTRIBUTORS FOR APPLYING ARTIFICIAL
MANURES AND OTHER GRANULAR MATERIALS TO LAND
Filed Jan. 23, 1957 3 Sheets-Sheet 3

Inventor
Gilbert S. Hartley
by Marian J. Hartley
Albert J. Drake
Attorney

United States Patent Office 2,893,610
Patented July 7, 1959

2,893,610

MECHANICAL DISTRIBUTORS FOR APPLYING ARTIFICIAL MANURES AND OTHER GRANULAR MATERIALS TO LAND

Gilbert Spencer Hartley and Marian Jennifer Hartley, Fulbourn, England

Application January 23, 1957, Serial No. 635,751

Claims priority, application Great Britain January 25, 1956

5 Claims. (Cl. 222—410)

This invention relates to mechanical distributors for applying artificial manures, chemical fertilizers or other granular materials to land.

Such distributors generally consist of a long hopper of triangular section mounted transverse to the direction of motion of the machine and into which material is poured from time to time, the material being caused to flow out of the hopper at a plurality of places at a steady, but adjustable, rate by means of rotating cups, oscillating slotted plates or rotating plates with spikes rotating at right angles thereto moved through mechanical coupling to the land wheels of the distributor or to a tractor drawing it.

The hopper is usually made of wood with the moving parts of mild steel or cast iron. The chemical action of fertilizer, particularly in moist weather, assisted by the grinding action of fertilizer particles and soil dust, produces rapid wear and deterioration of these moving parts of the fertilizer distributors.

Materials of sufficiently low cost to be used in such implements, with greater resistance to attack by chemicals and weather, could be found among synthetic or modified natural organic chemicals of the group generally known as plastics, but these materials are too soft or otherwise vulnerable to mechanical wear to have useful life in replacement of metal in machines of conventional design.

It is an object of the present invention to provid a machine in which abrasive action is reduced to so low a level that plastic materials can be successfully used for moving parts in contact with fertilizer.

Accordingly, the invention provides a distributor comprising a hopper for containing material to be distributed, a roller rotatable about an axis transverse to the direction of travel of the distributor and a member through which material to be distributed can be conducted from the hopper to the roller, the said member being provided with a discharge opening having side edges which contact the surface of the roller and converge towards an apex pointing away from the direction of movement of the roller surface and the other edge or edges of the opening being spaced from the surface of the roller. With the apparatus, abrasive action is so far reduced that even polyethylene, the most resistant of these plastic materials to weather and chemicals but also among the softest, can be successfully used and, because of its extreme chemical resistance, is preferred. As a result, the apparatus has a long working life with low maintenance costs and can be exposed to weather, and is cleaned by washing out and leaving to dry, without harm. Where polyethylene is referred to hereinafter it will be understood that other resistant plastics such as nylon, polystyrene, polyvinylchloride or cellulose esters could, though less advantageously, be used.

In the accompanying drawings:

Figure 1 is a front view of a distributor according to the invention,

Figure 2 is a section on line II—II of Figure 1,

Figures 3 and 4 are perspective views illustrating a shoe forming part of the distributors, Figure 5 is an end view while.

Figure 5:
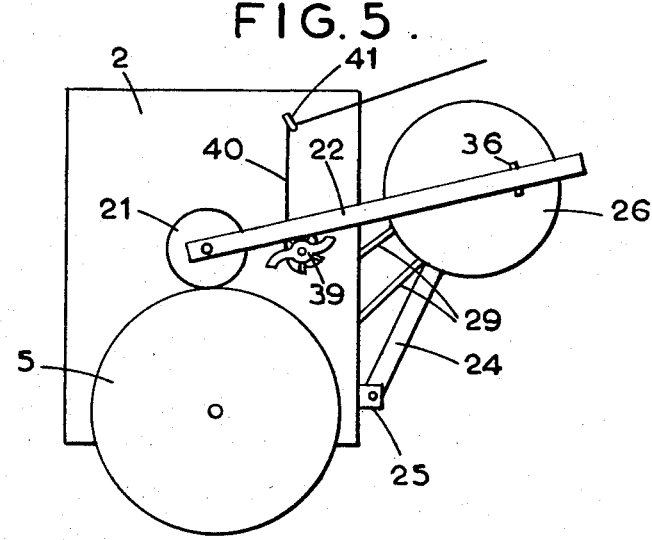

In the embodiment of the invention, illustrated in the drawings, a distributor comprises a wooden hopper 1 which is of conventional triangular section and is fitted with a hinged lid (not shown). The hopper has wooden inner end plates 2 to which are bolted steel outer end plates 3 having downward extensions carrying stub axles 4 on which land wheels 5 are mounted. Wooden strengthening bars 6 extend between the inner plates 2 and steel tension rods 7 are fixed to the bars 6 and have screw threaded ends projecting through holes in the end plates 3, nuts (not shown) being tightened on the tension rods to pull the end plates 3 towards one another against the spreading force produced by the outrigged land wheels 5.

The sloping wooden sides of the hopper 1 approach within two or three inches of one another at the bottom and their lower edges preferably lie in the same horizontal plane. The bottom of the hopper is a polyethylene sheet 8 attached to the lower edges of the hopper sides, as for example by wooden battens and screws (not shown). The bottom sheet is plane at its fixed edges, but is moulded elsewhere into a series of downwardly projecting outlet cones or funnels 9 (only some of which are illustrated) with openings of about ½ to 1 inch across at the bottom. A free-flowing granular or coarsely crystalline fertilizer will flow out of such a hopper through the funnels 9, leaving it almost completely empty, in the absence of the flow-controlling mechanism below described. To prevent blocking of the funnels with occasional lumps of fertilizer or extraneous matter, a screen of wood or woven wire (not shown) can be arranged in the conventional manner inside the hopper itself or is suitably disposed for use when filling it, the meshes of the screen being considerably smaller than the holes through which the fertilizer must pass in the flow-controlling mechanism.

The exits of the funnels 9 are arranged in line parallel with the length of the hopper 1. A distributor roller 10, which is preferably tubular for lightness and economy but could be solid, is mounted below the exit openings of funnels 9 in bearings fixed rigidly to the ends of the hopper and is coupled mechanically to the land wheels 5 of the distributor or to the tractor drawing it so as to rotate slowly when the distributor moves over the ground. In the embodiment illustrated, the roller is of polyethylene tube fitted over a steel tube which enables it to be supported (without significant sagging) by means of stub axles fixed to the outer end plates 3. The polyethylene roller 10 has flanges 12 at its ends and these are covered by polyethylene protective shrouds 13 fitted to the insides of the wooden end plates 2. The function of the roller is to regulate the flow of granular material from the funnels.

It has been found to be preferable that the roller 10 rotates in the same direction as the land wheels 5 as this causes fertilizer to fall over the forward face of the roller so that the distribution of fertilizer can be checked visually by the driver of the tractor towing the distributor. In the following description it is assumed that the roller rotates in this direction although it should be understood that the distributor can be arranged to operate with the roller rotating in the reverse direction.

Separate members 14, hereinafter called shoes, are situated between the funnels 9 and the roller 10. Each shoe 14 has a wider forward end resting on the roller 10 and a narrow rear end provided with an upwardly and rearwardly sloping spur 15 resting on a smooth support provided by a pin 16 in a bifurcated member 17 carried by the hopper 1 so that each shoe 14 is gently forced under gravity into forward contact with the roller 10. The shoe 14 is a hollow body which is open at the top and in vertical cross-section transverse to the direction of motion it is approximately U-shaped. A bottom opening has rims formed from the walls of the shoe to fit an arc of the roller circumference and from the front face to leave a gap 18 between the lowest remaining part of the face and the roller. The shoes are preferably made of polyethylene by injection moulding. Granular material filling the shoe is in contact with the roller surface, through the bottom opening, over an approximately triangular area; the apex of the triangle is rearward so that granules in contact with the forwardly moving roller surface are dragged in the direction of increasing width of the triangle, thus avoiding compression.

The height of the roller 10 with respect to the hopper 1, and the depth of the shoes 14 are such that the funnels 9 project below the tops of the corresponding shoes 14. When the hopper is filled, the granular material flows down the funnels 9, partly filling the shoes. It does not overflow the shoes because granular solids, unlike liquids, cannot rise spontaneously above their point of entry. The shoes 14 are however of sufficient depth, and the funnels 9 are mounted sufficiently high, for the shoes to be filled above the level of the gap 18 between the front wall of the shoe and the roller. This gap is sufficiently shallow, and the height of the support 16 under the rearward spur 15 is sufficiently low for the granular material, when the machine is at rest, to spill outwards only to a limited extent on to the roller. It has been found that all commercial fertilizers can be handled satisfactorily with a single setting of this height and the members 17 are therefore preferably fixed.

When the roller 10 rotates, the granular substance is carried forward and slightly upward on the surface of the roller and spills over on to the ground. The rate of delivery increases with the rate of rotation until such rates are reached that the rate of flow under gravity in the funnels 9 or shoes 14 becomes the limiting factor. The rate of flow is also clearly influenced by the size of the opening 18 between the front wall of each shoe 14 and the roller 10 but this is chosen so that the normal range of application rates can be obtained simply by varying the speed of rotation of the roller relative to that of the machine along the ground.

To prevent the shoes 14 from over-riding the roller 10 after an accidental jolt in use, a vertical spur 19 may project downwards from the lower edge of each of them so as to make contact with the rear face of the roller 10 if the shoe is dislodged forward. There is a gap between the point of contact of the spur and the apex of the discharge opening so that any granules escaping rearward of the roller can fall away without danger of lodging between the spur and the roller and so causing abrasion. If the roller is accidentally jolted rearward so that granules do so escape, the combined action of gravity and friction causes the shoe to move forward until the leakage is stopped.

The method of mounting provided by the invention reduces friction between shoes 14 and roller 10 to its necessary minimum, thereby avoiding unnecessary wear of those components made of soft material. Grinding action of the areas where frictional contact is maintained is avoided by the generally triangular area of contact of roller and granules in which movement is always in the direction of greater width, thereby avoiding compression. Furthermore, every point on the roller in contact with the shoes moves obliquely across the walls or rims defining the discharge openings from the free side to the filled side, thus keeping the area of contact free of abrasive matter.

The self-locating nature of the shoes 14 between the funnels 9 and the roller 10 also greatly assists to reduce abrasion as the only pressure between the walls contacting the roller and the roller itself is that contributed by the weight of the filled shoes.

There is sufficient free space between the sides of the funnels 9 and shoes 14 to accommodate at least two or three normal sized granules so that there is no jamming of free play of the shoes. The intrusion of the funnels 9 into the shoes 14 prevents sideways wandering of the latter along the roller. The shoes are prevented from tilting sideways by sufficient width of contact with the roller, which may be increased beyond that of the discharge openings by the provision of curved extensions 20 making light contact with the top of the roller 10. Alternatively, the shoes may be braced rigidly together in adjacent pairs, a single spur extending rearward and upward centrally from the bracing member.

The rate of application of material can be altered to a major extent by replacing one set of shoes by another having discharge openings of considerably different size. A quickly-made adjustment controlling the application rate within the range normal for fertilizer application, i.e. between 2 and 10 cwt. per acre, is provided by means of a variable gear between the land wheels or tractor power take-off and the roller.

Figure 6:
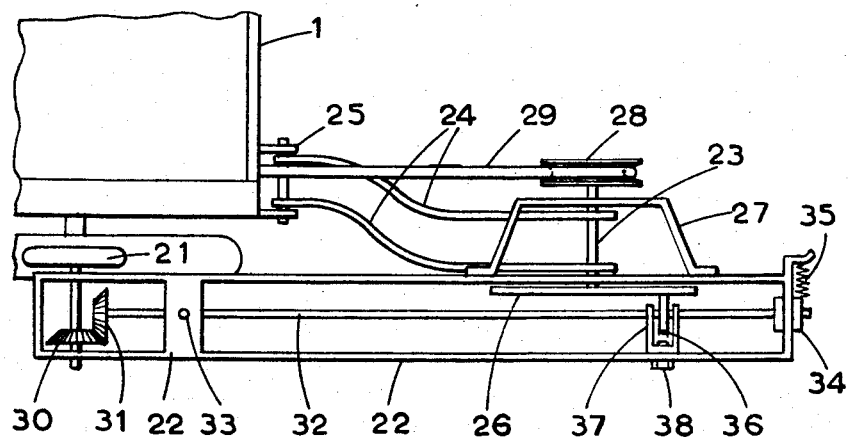
Figure 6 is a plan view of a variable ratio driving mechanism.

This variable gear may take any conventional form and owing to the light weight of the moving parts of the distributor can be one providing a low power output; one suitable gear, which is in no way an essential part of the invention, is illustrated in Figures 5 and 6. In the working position a small rubber-tyred wheel 21 rests on the top of the land wheel 5, and is driven thereby. The axle of this wheel rotates in bearings in a framework 22 pivoted about an axle 23 which rotates also in another framework 24, itself pivoting about a member 25 attached to the hopper. On the axle 23 is a circular plate 26 turning in bearings in a framework 27 rigidly attached to the framework 22, carrying at the other end of its axle a pulley wheel 28 rotating, by means of a belt 29, a pulley wheel mounted on the polyethylene roller 10 between the protecting shroud 13 on the inside of the hopper end plate 2 and the first funnel. A bevel wheel 30 on the same axle as the take-off wheel 21 engages with a second bevel wheel 31 fixed to an axle 32 which turns inside the framework 22 lying longitudinally inside the framework. This axle turns in a bearing rotatably mounted in a pivot 33 perpendicular both to its own axis and that of the wheel 21, and in a terminal bearing 34 sliding in a slot in the end of the framework and constrained by a tension spring 35. A small rubber-tyred wheel 36 engages a spline on the axle 31 and is controlled for position by a forked member 37 moving in a slot in the framework and fixable thereto by a nut 38. This small wheel is pressed against the circular plate 26 and drives it, and thereby the roller 10, through the belt 29 at a speed having a ratio to that of the land wheel dependent on the position at which the member 37 is fixed on the framework 22. The weight of the assembly holds the belt 29 taut, by pivoting about 25, and the weight of wheel 21 and framework 22 holds the wheel 21 against the land wheel by pivoting about axle 23. In order to interrupt the drive while the machine is moving, a rotatable two-cam wheel 39 (not shown in Figure 6) is mounted on the end plate of the hopper so that when a cam is uppermost it lifts the framework 22, and disengages the wheel 21 from the land wheel 5. The position of this two-cam wheel is altered by attaching it to a four-position spring-loaded ratchet wheel which is, in the conventional manner, turned through a quarter revolution everytime a string 40 passing through an eye 41 and on to the driving seat of the tractor, is pulled. Successive pulls on the string therefore disengage and re-engage the drive. The machine may be drawn by a tractor through tow bars (not shown) connected with vertical steel bars 42 extending between the front wall of the hopper 1 and the strengthening bars 6. This arrangement strengthens the hopper framework as well as providing a connection for the tow bars.

It will be evident that the flow of material is controlled by the triangular opening in each shoe 14 which is curved to fit the roller at its sides, but with a gap 18 between roller and end wall through which the granules spill when assisted by movement of the roller surface from the fitting apex of the curved triangle towards its noncontacting base. It is therefore evident that the same flow control could be obtained by forming the ends of the funnels themselves into this special form and arranging for them to be appropriately in contact with the roller, the separate shoes being thus dispensed with. This simplified arrangement is preferred in a very small machine, as might for example be required in inter-row work in market gardens. For normal field use, where some 24 funnels may be required to contact a 12 foot long roller, a degree of precision would be needed unlikely to be maintained in agricultural usage and difficult to attain in a soft material, unless the funnels were made elastically deformable, as for example by a concertina like construction.

If the hopper 1 and its attached members are mounted rigidly on the tractor or on a trailer unit, the distributor gives a satisfactory performance on reasonably flat ground. However, when ascending or descending steeply sloping ground, the inclination of the shoes 14 necessarily changes; consequently an increased dosage of fertilizer is distributed when the machine goes downhill and a decreased dosage when it goes uphill, unless the control mechanism is operated when the slope changes. To overcome this disadvantage, there can be rigidly mounted on to the sides of the hopper two curved members which carry pivots or hooks situated directly over the hopper. These link with hooks or pivots carried on rearward-curving members rigidly attached to the tractor or trailer frame. The hopper is thus suspended so as to be free to swing in a forward and backward direction. It thus maintains its inclination independent of the slope of the ground.

Alternatively, the hopper 1 can be rigidly fixed to the supporting frame, but the roller 10, its bearings and the members 17 supporting the rear ends of the shoes, are formed into a separate unit which is free to swing about pivots attached to the ends of the hopper in approximately the same line as the bottoms of the funnels. This combined member has downward extensions to which weights can be attached and therefore maintains a standard inclination irrespective of the tilt of the rest of the machine.

What we claim is:

1. A distributor for applying artificial manures and other granular material to land comprising a hopper adapted to contain material to be distributed, a discharge funnel leading from said hopper, a distributor roller rotatable about an axis transverse to the direction of travel of the distributor, a hollow member having an open top through which said funnel extends and urged by gravity into contact with the surface of said roller, said member having walls shaped to fit said roller surface and to form edges defining a bottom discharge opening having side edges which contact the surface of said roller and converge towards an apex pointing away from the direction of movement of said roller surface and another edge spaced from said roller surface.

2. A distributor for applying artificial manures and other granular material to land comprising a hopper adapted to contain material to be distributed, a discharge funnel leading from said hopper, a distributor roller rotatable about an axis transverse to the direction of travel of the distributor, a smooth support fixed with respect to said hopper, a hollow member resting at one end on the surface of said roller and having a spur sloping upwards and away from the other end and resting on said smooth support, said hollow member having an open top through which said funnel extends and walls shaped to fit said roller surface and to form edges defining a bottom discharge opening having side edges which contact the surface of said roller and converge towards an apex pointing away from the direction of movement of said roller surface and another edge spaced from said roller surface.

3. A distributor as claimed in claim 2 in which said discharge funnel, said distributor roller, and said hollow member have at least a facing of weather and corrosion resistant plastic material.

4. A distributor for applying artificial manures and other granular materials to land comprising a hopper adapted to contain material to be distributed, a distributor roller having at least a facing of weather and corrosion resistant plastic material and rotatable about an axis transverse to the direction of travel of the machine, and a member through which said material can be conducted from said hopper to said roller, said member having at least a facing of weather and corrosion resistant plastic material and being provided with a discharge opening side edges of which contact the surface of said roller and converge towards an apex pointing away from the direction of movement of said roller surface and another edge of which is spaced from said roller surface.

5. A distributor as claimed in claim 1 in which said distributor roller has a facing of polyethylene and said hollow member is a polyethylene moulding.

References Cited in the file of this patent

UNITED STATES PATENTS

| | | |
|---|---|---|
| 232,718 | Hoke | Sept. 28, 1880 |
| 336,496 | Sombart | Feb. 16, 1886 |
| 1,150,996 | Carr | Aug. 24, 1915 |